G. W. GRAVES.
OVEN.
APPLICATION FILED JUNE 13, 1913.
1,126,753.
Patented Feb. 2, 1915.
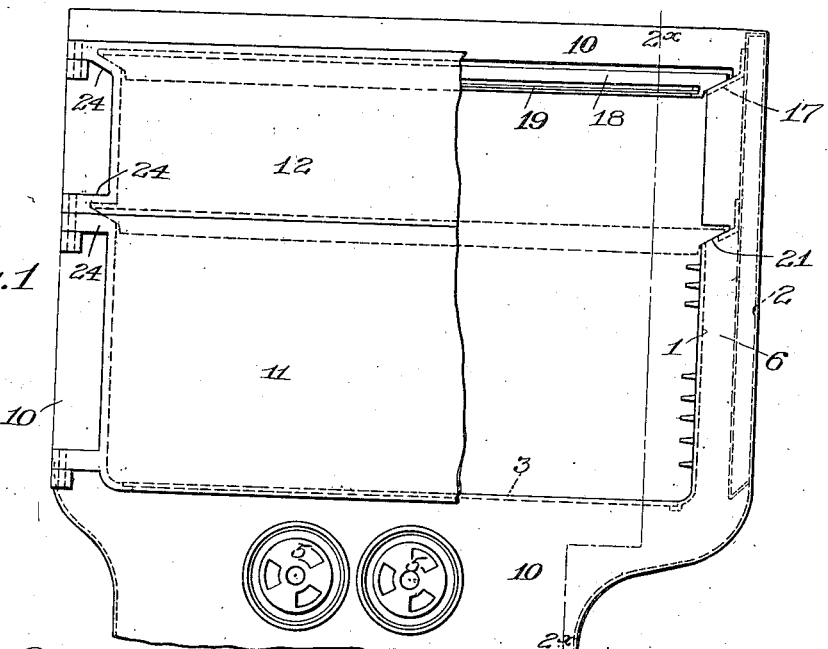
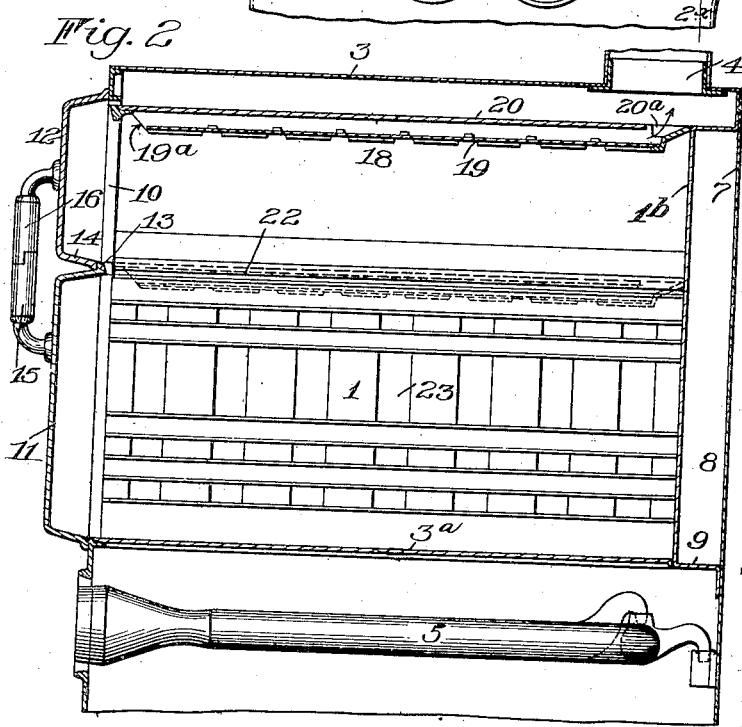
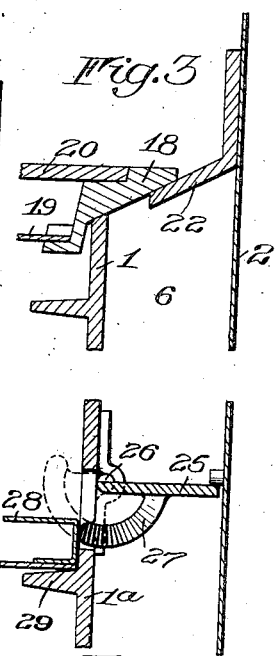
Inventor
George W. Graves

UNITED STATES PATENT OFFICE.

GEORGE W. GRAVES, OF WASHINGTONVILLE, NEW YORK.

OVEN.

1,126,753.  Specification of Letters Patent.  Patented Feb. 2, 1915.

Application filed June 13, 1913. Serial No. 773,435.

*To all whom it may concern:*

Be it known that I, GEORGE W. GRAVES, of Washingtonville, in the county of Orange, in the State of New York, have invented certain new and useful Improvements in Ovens; and I do hereby declare the following to be a full, clear, and exact description of the same, reference being had to the accompanying drawings, forming a part of this specification, and to the reference-numerals marked thereon.

My present invention relates to ovens, particularly those adapted to be used in connection with cooking stoves, and it has for its object to provide an oven, the constructional elements of which renders it adaptable for use in cooking where the necessary heat is afforded by means of a gas flame obtained from suitable burners, the object sought by the invention being to provide an oven in which the cubical capacity may be varied so that an oven of given dimensions may be rendered smaller in capacity and the necessary changes made in the flues to the end that the baking processes performed by the smaller oven may be equally efficient with those effected by the oven of full dimensions and with a saving in fuel.

To these and other ends the invention consists in certain improvements and combinations of parts, all as will be hereinafter more fully described, the novel features being pointed out in the claims at the end of the specification.

In the drawings: Figure 1 is a front elevation of an oven, parts thereof being shown in cross section to illustrate the details of the flue construction and the adjustable oven top; Fig. 2 is a central cross sectional view taken on the line 2˟—2˟ of Fig. 1; Fig. 3 is an enlarged cross sectional view showing the coöperation between the adjustable oven top and one of the flue flanges or baffle plates, and Fig. 4 is a detail sectional view of a modification in which a movable damper is employed for stopping off the top of the flue.

Similar reference numerals throughout the several figures indicate the same parts.

In the construction of baking ovens, especially those employed in connection with gas stoves or ranges, there is provided at one or more sides of the oven chamber the hot air flues, which are made of given dimensions proportionate to the size of the oven chamber, which conduct the products of combustion upwardly around the sides of said chamber and cause the circulation of air currents in the latter so that a uniform and even temperature is obtained in all parts of the oven. Consequently, any diminution occurring in the size of the chamber must, in order to preserve the perfect baking qualities of the oven, also make provision for proportionately decreasing the area or capacity of the flues at the sides of the oven chamber and comprise an arrangement of parts whereby the proper circulation of heated air currents may be maintained both in said flues and the baking chamber when such changes are made.

In illustrating my present invention I have shown one embodiment thereof adapted for use in the construction of a gas stove or range comprising the inner chamber, or oven proper, composed of the side walls 1, the rear wall 1ᵇ and bottom 3ᵃ. This chamber is inclosed within the outer side walls 2 and the top 3 and from the rear side of the latter leads the ventilating pipe 4. These outer walls extend below the oven chamber and in the space provided below the bottom 3ᵃ, gas burners 5 of the usual or any preferred construction are located. Between the pair of inner and outer side walls 1 and 2 are formed the side flues 6, and between the rear wall 1ᵇ of the oven and a corresponding outer wall 7 may be provided the insulation space 8.

The front side of the oven chamber is open and is bounded by the stove plate or front 10 which is preferably a metal casting which covers and forms the front walls of the flues 6—6, and also serves as a support for the oven door, although in practice I prefer to employ two oven doors or divide the usual door into two parts, as indicated by 11 and 12, the former covering the lower portion of the oven chamber or that part which constitutes the smaller oven, while the latter covers the remaining portion of the opening. In mounting these two doors I arrange the upper one so that it may be opened independently in the event it is desired to employ this portion of the oven chamber as a warming closet, but it is connected with the lower door so that when this is opened it will carry with it the upper one. In carrying out this feature of the invention I provide the door 11 with the flange 13 along its upper edge which closes within the flange 14 on the door 12 and in constructing the handles of the door I employ a single handle formed in two parts, as indicated by 15 and 16, the meeting ends of which are notched and interlocked in the same manner as the flanges 13 and 14.

The reduction of the cubical capacity of the oven is, broadly speaking, effected by the adjustment of one of its several sides and in carrying out this idea I lessen the height of the oven by employing what may be termed a supplemental top capable of adjustment, between the side walls, relatively to the oven bottom. In conjunction with this adjustable, supplemental, or auxiliary top, I provide means for reducing the height of the flues so that the air currents will circulate around and within the smaller chamber and will not be dissipated in uselessly heating to a high temperature the unused space of the full sized oven. The upper ends or tops of the side flues 6—6 are closed by flanges 17 and the top wall of the oven chamber is constructed in such a manner that it may be adjusted from its normal position, shown in Fig. 1 in full lines, to the position which it occupies when an oven of lesser dimensions is desired, as shown by the dotted lines in Figs. 1 and 2.

While I have only shown the oven top as capable of being withdrawn and inserted in the one intermediate position, it will be understood that provision may be made for locating at two or more points should occasion require. In providing for the adjustability of the oven top I provide a simple and convenient means by which the flues may be closed or stopped off substantially in alinement with said top so that the baking operations performed in the smaller oven will be perfectly satisfactory by reason of the even distribution of the heated air currents. The oven top or member is made of an open rectangular metal frame 18 supporting in spaced relation a lower plate 19, of thin sheet metal, and an upper plate 20 which is preferably formed of an asbestos board possessing the requisite stiffness to form an adequate support for dishes which may be placed thereon when said top occupies the dotted line position and it is desired to utilize the space above it as a warming closet. The space between the plates 19 and 20 forms a ventilating passage through which the heated air escapes from the oven, and in order to facilitate the circulation thereof, the inlet aperture is provided in the lower plate 19 at the front of the oven, as indicated by 19ª, and the outlet aperture is formed at the rear edge of the plate 20, as indicated at 20ª.

The width of the frame 18 is greater than the internal width of the oven chamber and the inner side walls 1—1 thereof are slotted horizontally from front to rear, the upper slots coinciding with the flanges 17, while the other slots are provided at any desirable point, or points, as indicated by 21. Opposite the slots 21 and extending inwardly from the outer walls 2—2, are plates or flanges 22, the inner edges of which do not engage the walls 1 but coöperate with the laterally projecting edges of the adjustable oven top so as to stop off the flues 6—6 when said top is in its adjusted position, as shown in dotted lines in Fig. 1 and in full lines in the detail view shown in Fig. 3. The flanges 22 also serve as baffle plates which act to retard the upward movement of the air current so that portions of the latter entering the lower ends of the flues will be forced into the sides of the oven near the bottom and through the perforations 23 in the walls 1—1. It will be understood that the front plate 10 is provided with notches extending laterally from the inner edges of the door opening which coincide with the transverse slots formed in the walls 1—1 so that the adjustable oven top member may be conveniently removed and inserted at will, said slots being covered by ears or projections 24 formed on the door flanges.

In Fig. 4 I have shown a modified arrangement of the parts whereby the tops of the flues may be stopped off or closed by a swinging damper 25 pivoted at 26 to the outer face of the wall 1ª. The means for operating the damper comprises the curved finger 27 which projects into the oven chamber and when engaged by the oven top member 28 will cause the damper to swing from the vertical to the horizontal position, as shown in full lines. This structure is, in some instances, desirable as it obviates the slotting of the side walls and permits the auxiliary oven top member to be supported upon the inwardly projecting lugs 29 employed for supporting the usual perforated oven shelves. In arranging these parts it is preferable to position the pivot points 26 of the dampers, the operating fingers 27 of the latter, and the lugs 29 in substantially the relative positions shown in Fig. 4, so that the dampers will be operated only by the adjustable oven top which possesses considerable thickness and will not be actuated by the placing of a thinner oven shelf upon said lugs.

An oven embodying my invention in which the normal cubical capacity may be reduced and the relative arrangement of the air circulating flues maintained possesses great advantages because the usual domestic baking operation of the housewife may be performed in the smaller oven with a saving in the cost of fuel.

I claim as my invention:

1. The combination with inner and outer walls separated to form a flue and disposed to provide the sides of an oven, of an oven bottom and a hollow oven top adjustable at various points of elevation relatively to the bottom and having inlet and outlet openings forming an outlet passage leading from the oven chamber and means for closing off the side flue at the points of adjustment of said top to divert the products of combustion into the oven chamber.

2. In an oven, the combination with inner and outer side walls arranged to form an oven inclosure having an open side and providing surrounding flues, said inner walls being slotted in different planes, of a removable oven top having edge portions fitting said slots and extending across the flues to close the latter at the point where said top is inserted.

3. In an oven, the combination with inner and outer side walls arranged to form an oven inclosure having an open side and provided with surrounding flues, said inner walls being slotted horizontally at different points, of a removable oven top having edge portions adapted to project through the slots and baffle flanges in the flues coöperating with said edges to close the flues at the point where said top is inserted.

4. The combination with inner side walls of an oven having horizontal slots, outer spaced walls forming flues and baffle plates extending part way across the latter in proximity to the slots, of a plate fitting into said slots and coöperating at its edges with said baffle plates to close the flues.

5. In an oven, the combination with inner and outer side walls disposed to form an oven inclosure with flues at the sides, said inner walls being slotted, of a plate extending transversely of the oven and slidable into said slots in a direction from front to rear of the oven, the plate when thus inserted serving to reduce the height of the oven and flues.

6. The combination with the walls of an oven, of a hollow auxiliary oven top adjustable in the oven to vary its height and provided with an inlet and discharge openings at different points, the inlet being arranged to communicate with the oven chamber.

7. The combination with inner and outer walls separated to form a flue and disposed to provide the sides of an oven, the inner walls being provided with inlets, of an oven bottom and an oven top adjustable at various points of elevation relatively to the bottom and having openings forming an outlet passage leading from the oven chamber and means for closing off the side flue at the points of adjustment of said top to divert the products of combustion into the oven chamber.

8. The combination with inner and outer walls separated to form a flue and disposed to provide the sides of an oven, of an oven bottom and an oven top adjustable at various points of elevation relatively to the bottom and having openings forming an outlet passage leading from the oven chamber, said inner walls having inlet openings below the lowermost position of the oven top to admit the products of combustion into the oven chamber.

GEORGE W. GRAVES.

Witnesses:
ANNIE R. MCGRATH,
G. WILLARD RICH.